(12) United States Patent
Huang et al.

(10) Patent No.: US 6,992,657 B2
(45) Date of Patent: Jan. 31, 2006

(54) INPUT DEVICE

(75) Inventors: Mao-Sung Huang, Taoyuan (TW); Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 438 days.

(21) Appl. No.: 10/154,996

(22) Filed: May 24, 2002

(65) Prior Publication Data

US 2002/0175957 A1   Nov. 28, 2002

(30) Foreign Application Priority Data

May 24, 2001   (TW)   ................................ 90112543 A

(51) Int. Cl.
*G09G 5/00*   (2006.01)
*H03K 17/94*   (2006.01)

(52) U.S. Cl. ........................................ 345/168; 341/22

(58) Field of Classification Search ................. 345/168; 341/22, 20; 400/492, 473; 361/680, 679, 361/681, 686
See application file for complete search history.

(56) References Cited

U.S. PATENT DOCUMENTS

| | | | | |
|---|---|---|---|---|
| 3,940,758 A | * | 2/1976 | Margolin | 345/169 |
| 5,163,765 A | * | 11/1992 | Levy | 400/492 |
| 5,502,460 A | * | 3/1996 | Bowen | 345/168 |
| 5,539,615 A | * | 7/1996 | Sellers | 361/680 |
| 5,543,787 A | * | 8/1996 | Karidis et al. | 341/20 |
| 5,612,691 A | * | 3/1997 | Murmann et al. | 341/22 |
| 5,644,338 A | * | 7/1997 | Bowen | 345/168 |
| 5,659,307 A | * | 8/1997 | Karidis et al. | 341/22 |
| 5,687,058 A | * | 11/1997 | Roylance | 361/680 |
| 5,717,431 A | * | 2/1998 | Chia-Ying et al. | 345/168 |
| 5,731,808 A | * | 3/1998 | Gaither | 345/168 |
| 5,733,056 A | * | 3/1998 | Meagher | 400/472 |
| 5,788,386 A | * | 8/1998 | Hayashi et al. | 400/489 |
| 5,841,635 A | * | 11/1998 | Sadler et al. | 361/749 |
| 5,870,034 A | * | 2/1999 | Wood | 341/22 |
| 5,982,612 A | * | 11/1999 | Roylance | 361/680 |
| 5,995,025 A | * | 11/1999 | Sternglass et al. | 341/22 |
| 6,055,153 A | * | 4/2000 | Chiu et al. | 361/687 |
| 6,068,417 A | * | 5/2000 | Butler | 400/492 |
| 6,111,527 A | | 8/2000 | Susel | 341/22 |
| 6,118,436 A | * | 9/2000 | Kushita | 345/173 |
| 6,121,958 A | * | 9/2000 | Clark et al. | 345/168 |
| 6,174,097 B1 | * | 1/2001 | Daniel | 400/472 |
| 6,184,804 B1 | * | 2/2001 | Harrison | 341/22 |
| 6,256,017 B1 | * | 7/2001 | Bullister | 345/168 |
| 6,331,850 B1 | * | 12/2001 | Olodort et al. | 345/168 |
| 6,535,605 B1 | * | 3/2003 | Ghassabian | 379/433.1 |
| 6,536,966 B1 | * | 3/2003 | Butler | 400/492 |
| 6,665,173 B2 | * | 12/2003 | Brandenberg et al. | 361/680 |
| 6,707,664 B2 | * | 3/2004 | Murphy | 361/680 |
| 6,737,809 B2 | * | 5/2004 | Espiau et al. | 315/39 |
| 2001/0012196 A1 | * | 8/2001 | Zamora et al. | 361/683 |

FOREIGN PATENT DOCUMENTS

| | | |
|---|---|---|
| TW | 89211621 | 7/2000 |
| TW | 89219313 | 11/2000 |
| TW | 90200655 | 1/2001 |

* cited by examiner

*Primary Examiner*—Ryan Yang
(74) *Attorney, Agent, or Firm*—Snell & Wilmer L.L.P.

(57) ABSTRACT

An input device with a number of key sets is described. The input device has a first state when the key sets are configured in different levels, and a second state when the key sets are configured to be side-by-side.

23 Claims, 13 Drawing Sheets

INPUT DEVICE

This application claims priority of Taiwan Patent Application Serial No. 90112543 filed on May 24, 2001.

FIELD OF INVENTION

The present invention relates to an input device and especially to an input device which can change its configuration.

BACKGROUND OF THE INVENTION

Since the birth of notebook computers, many types of small-sized computers have been produced. A common problem associated with the smaller size, however, is that miniaturized input/output devices (such as keyboards) can be cumbersome, slow and uncomfortable to use.

The personal digital assist (PDA), which is typically smaller than a notebook computer, has become very popular in recent years. PDAs typically include a liquid crystal display (LCD) for receiving input and displaying information to the user. Unlike the conventional desktop computer, a PDA does not typically have a conventional keyboard, and has only limited control buttons thereon and a stylus that can be used to input data on the display. The PDA may store handwriting in bitmap or another graphical form, but this technique is typically cumbersome to process, requires a large amount of memory and lowers the efficiency of the PDA. Another method for inputting data to a PDA involves handwriting recognition software installed in the PDA. The PDA encoder translates handwriting to ASCII or another alphanumeric code, and then stores the alphanumeric data. Alternatively, the PDA may have a virtual keyboard. When the virtual keyboard is displayed on the screen, a user can utilize the stylus or control buttons to activate keys within the virtual keyboard to input data.

Conventional input methods for PDAs, however, are not typically as efficient as using a conventional computer keyboard. A typical PDA does not include a conventional keyboard because of relatively large size of the keyboard. Various forms of externally-connectable keyboards have been fashioned to work with PDAs, however. When a user wants to input data, the user connects the separable keyboard to the PDA for rapid data entry.

There are at least two types of the conventional separable keyboards for PDAs. One type is similar to the conventional computer keyboard, but smaller in size. The other is a foldable keyboard whereby a keyboard is separated into at least two parts that are foldably connected to each other. When the foldable keyboard is not in use, it can be folded and conveniently stored. Nevertheless, it is desirable to crate a mechanically and ergonomically improved foldable keyboard.

SUMMARY OF THE INVENTION

A primary aspect of the present invention is to provide an input device with small size and convenience of usage.

Another aspect of the present invention is to provide an input device which includes first and second key sets. When the input device is in a first state, the first key set is parallel to the second key set. When the input device is in a second state, the first and second key sets are configured to be side-by-side.

When the input device is in the first state, the size of the input device is reduced for storage. When the input device is in the second state, the user is allowed to utilize the input device conveniently.

DETAILED DESCRIPTION

Figure 1:
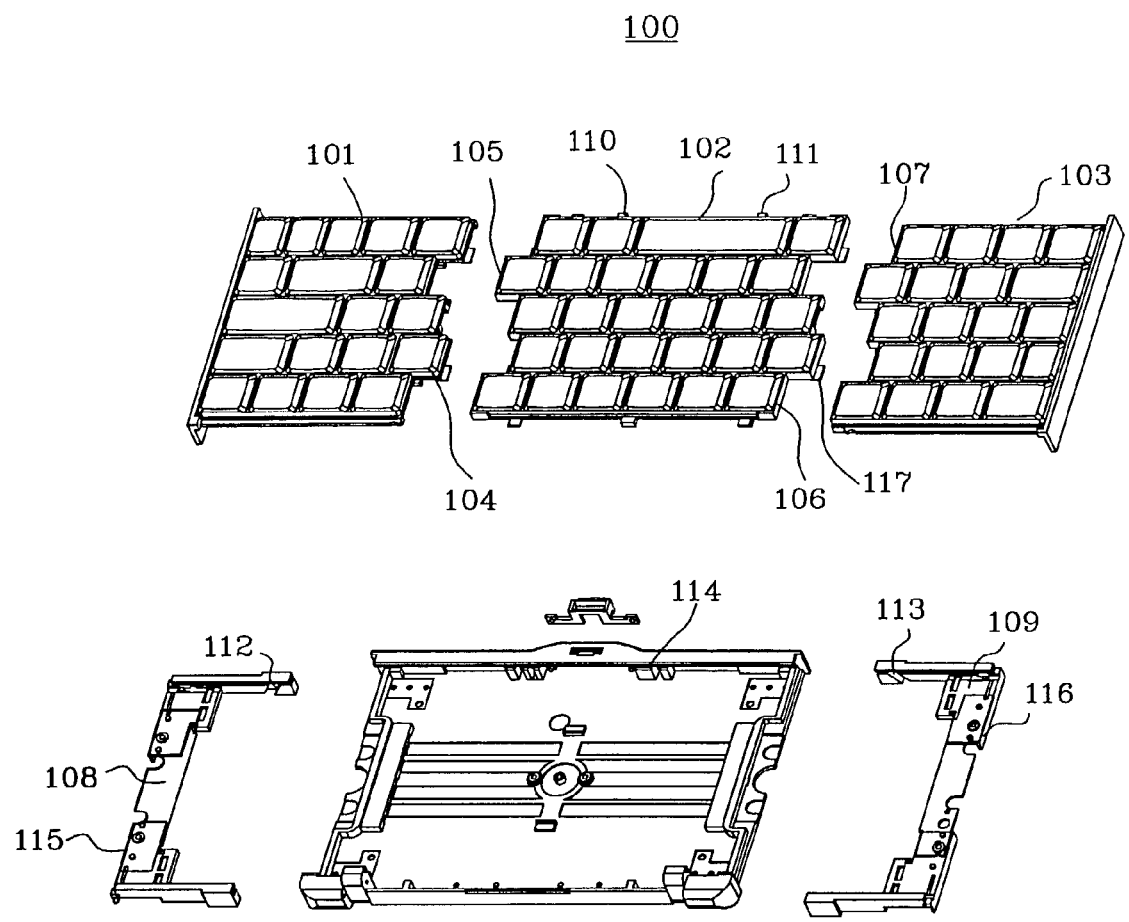
FIG. 1 is a schematic diagram showing an exemplary input device of the present invention.

With reference to FIG. 1, an input device 100 suitably includes a first key set 101, a second key set 102, and a third key set 103. Each key set has a key panel facing towards a user. First key set 101 has a first key panel, second key set 102 has a second key panel, and third key set 103 has a third key panel. The first, second, and third key sets are slidably connected to each other, as appropriate, using any sort of pin, hinge, or other arrangement.

The first key set 101 also has a first edge 104, which includes a number of key edges. The second key set 102 also has a second edge 105 and a third key edge 106, which respectively include a number of key edges. The third key set 103 also has a fourth edge 107, which includes a plurality of key edges.

Figure 2A:
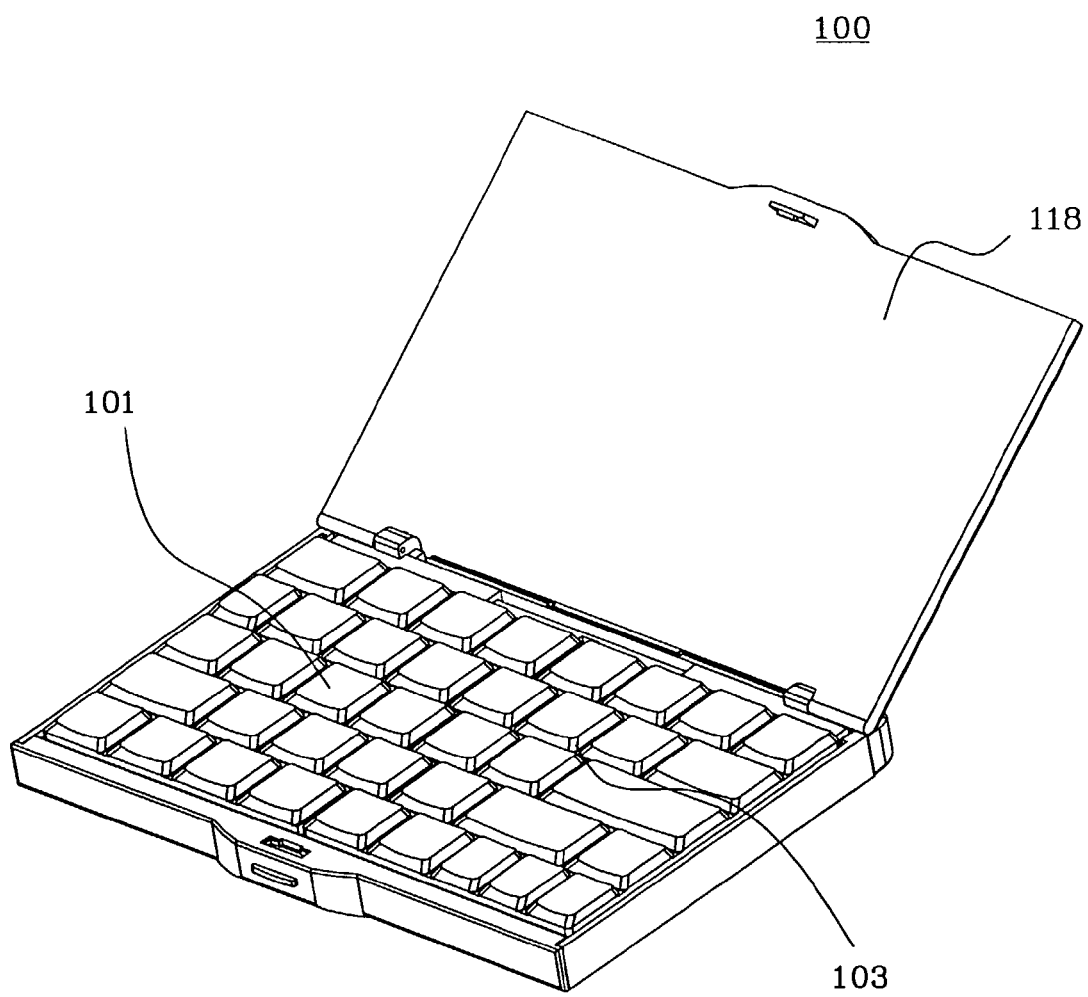
FIG. 2a and FIG. 2b are schematic diagrams showing an exemplary input device in the first state.
Figure 2B:
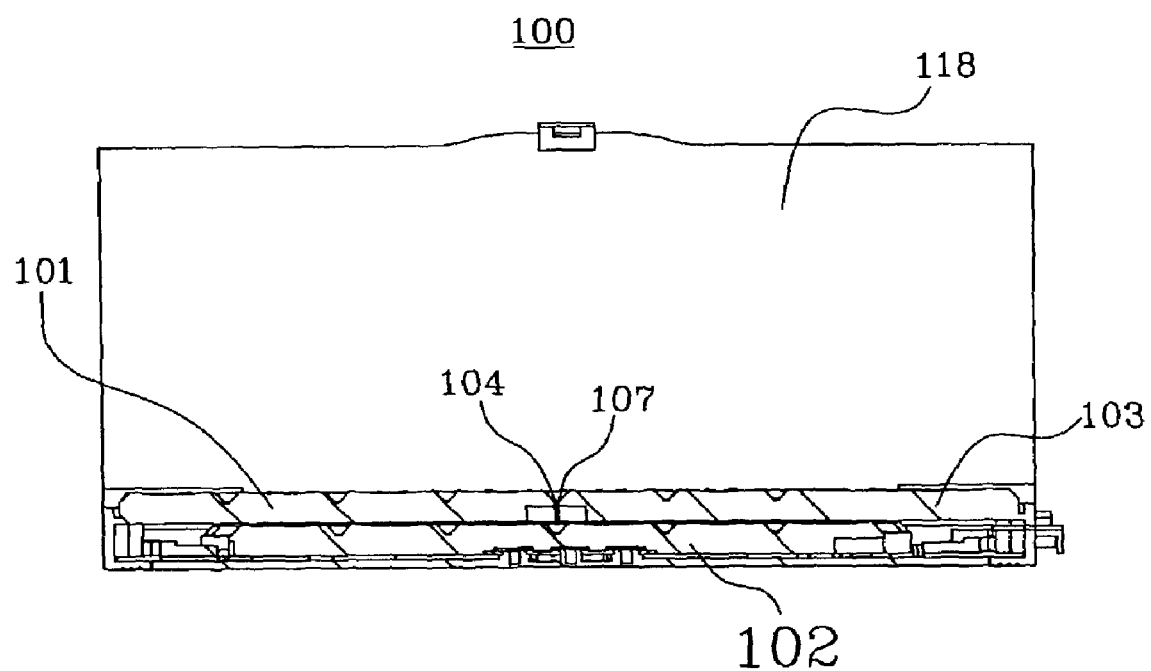

When input device 100 is in the first state, second key set 102 is in a spatial position lower than the first key set 101 and the third key set 103. FIG. 2a is a perspective view showing the input device 100 in the first state. The first key set 101 and the third key set 103 are shown in the same plane and parallel to second key set 102 with the first edge 104 adjacent to fourth edge 107. FIG. 2b is a front view showing the configuration of input device 100 in the first state. It is clear that the key set 102 is in a position beneath the first key set 101 and the third key set 103.

Figure 3A:
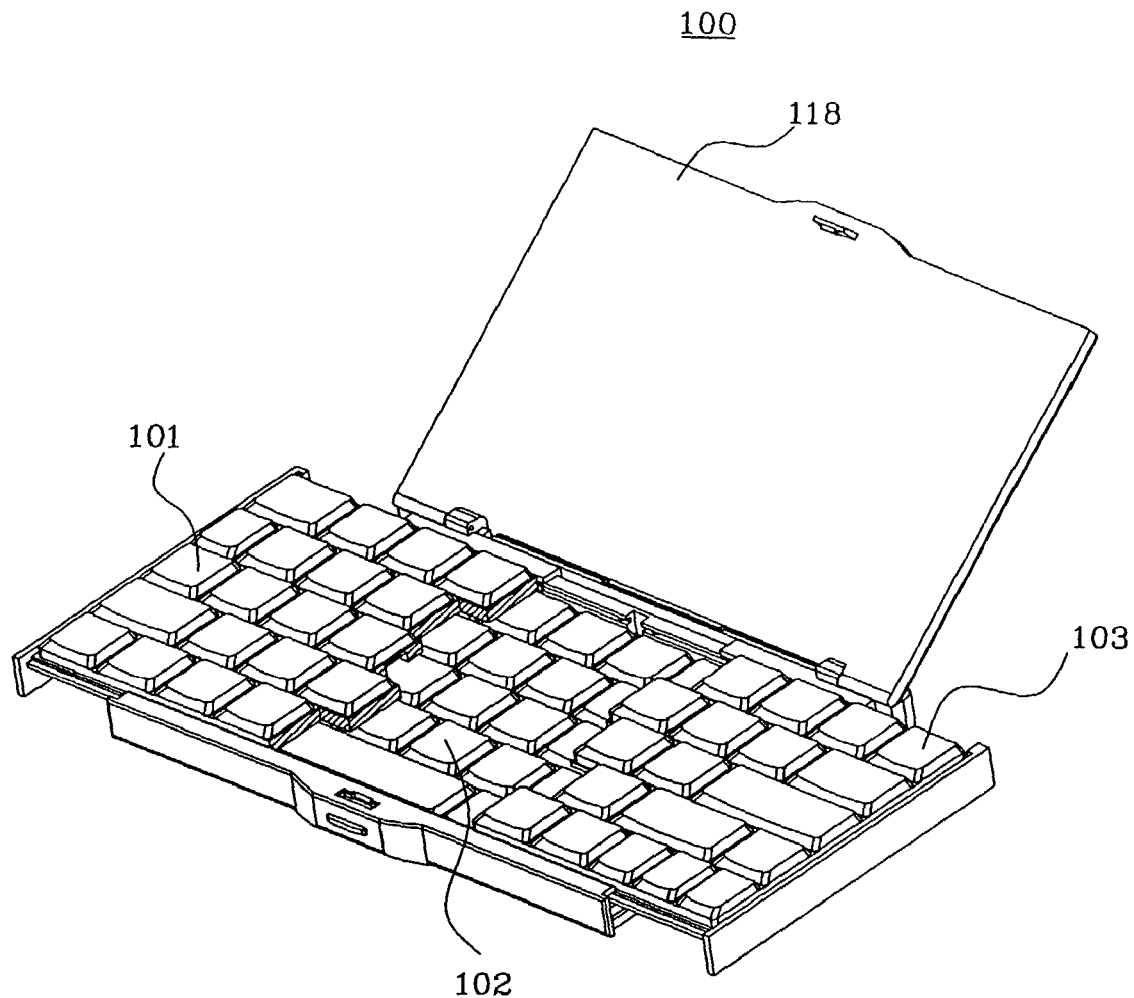
FIG. 3a and FIG. 3b are schematic diagrams showing exemplary input devices changing from the first state to the second state.
Figure 3B:
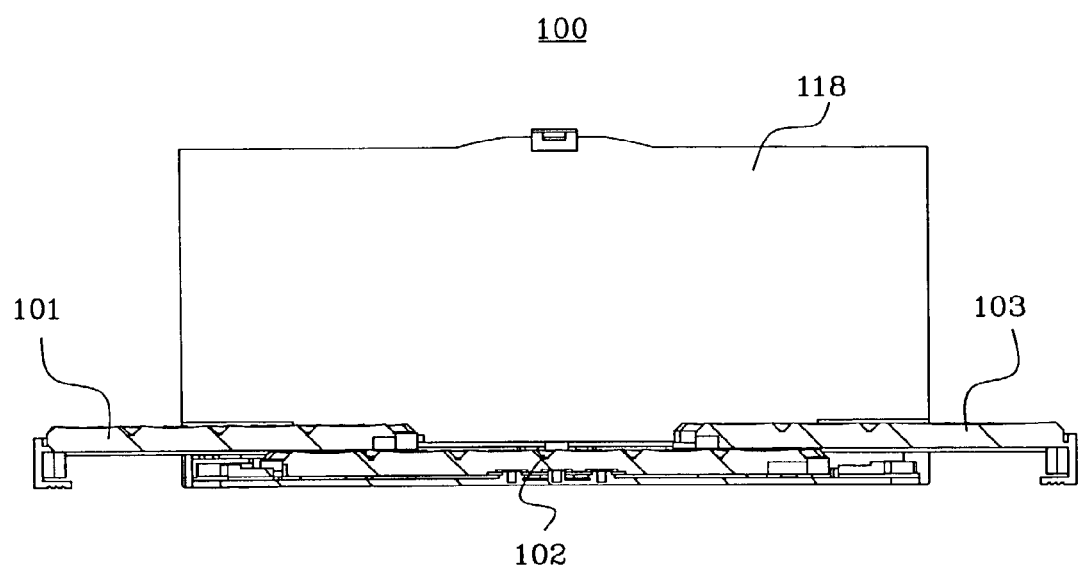

When first key set 101 slides to move away from the third key set 103, second key set 102 comes into the users' view, as shown in FIG. 3a. FIG. 3b is a front view showing input device 100 changing from the first state to the second state.

Figure 4A:
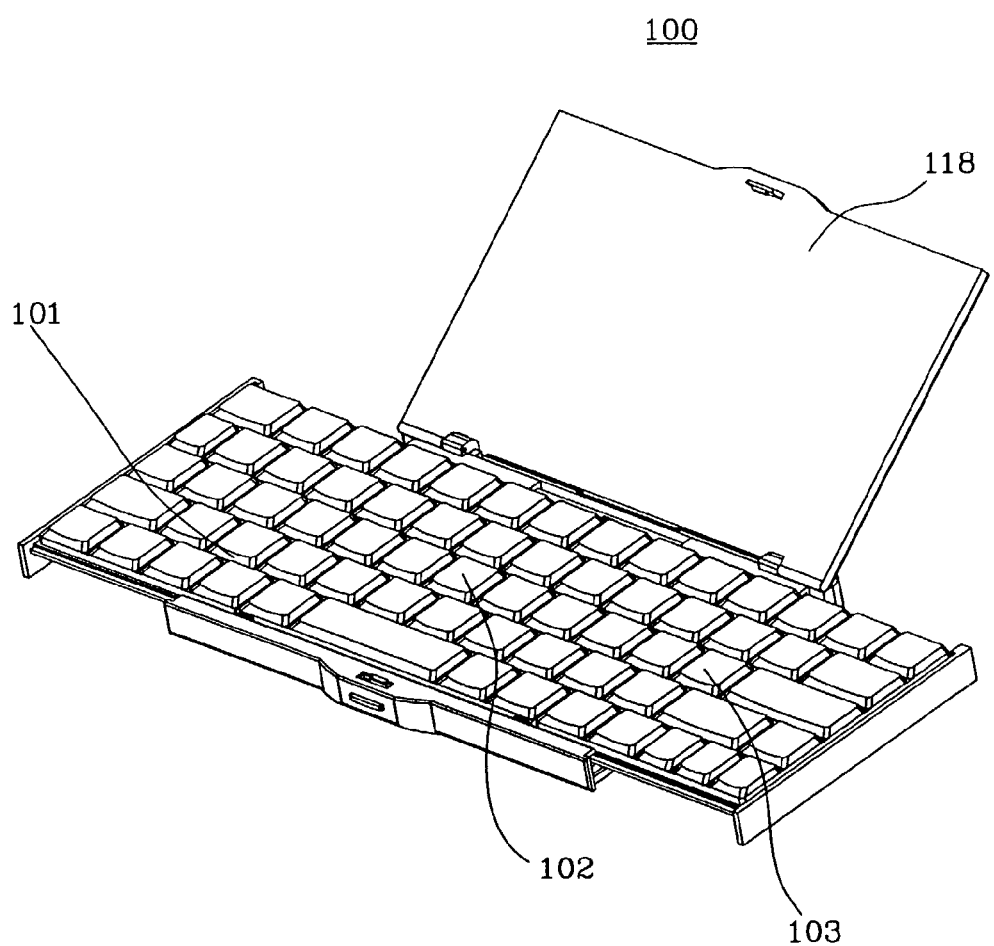
FIG. 4a and FIG. 4b are schematic diagrams showing the exemplary input device in the second state.
Figure 4B:
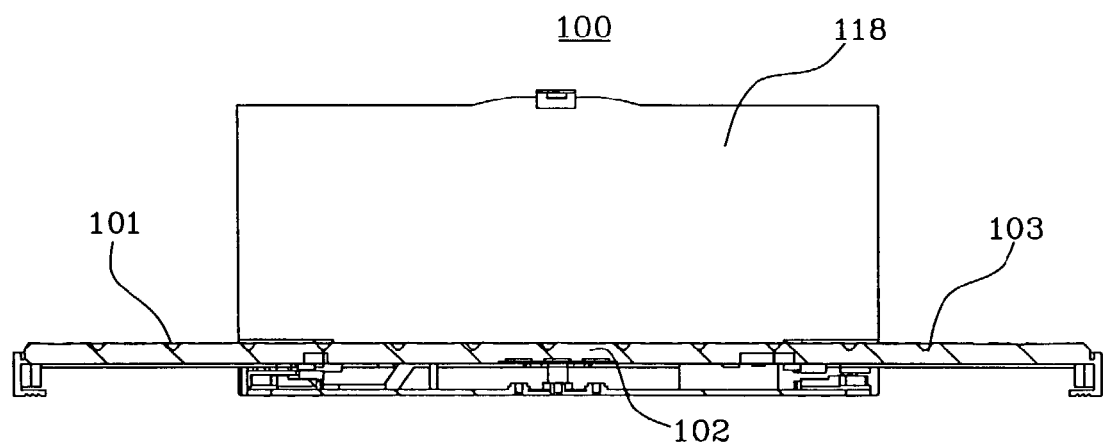

At the end of the expansion process, the second key set 102 raises up to the same plane as first key set 101 and third key set 103. When first key set 101 and third key set 103 are adjacent to second key set 102, input device 100 is in the second state. As shown in FIG. 4a, when input device 100 is in the second state, first key set 101, second key set 102, and third key set 103 are in the same plane. FIG. 4b is a front view showing input device 100 in the second state. In this manner, first edge 104 is adjacent to second edge 105 while third edge 106 is adjacent to fourth edge 107.

The arrangements shown in FIG. 2a and FIG. 4a can reduce the space occupied by the key sets. In either of the first or second states, input device 100 has uniform gaps between key switches, as appropriate.

Input device 100 may further include an automatic or manually-activated unit to make the transformation between the first and second states easier. For example, an automatically activated unit is disposed under the second key set 102 to automatically move the second key set 102 upwardly or downwardly relative to first key set 101 and third key set 103. There are several embodiments disclosed as follows.

In one exemplary embodiment shown in FIG. 1, the input device 100 includes a first frame 108, a second frame 109 and a case 114. First frame 108 is shown beneath first key set 101, and second frame 109 is shown beneath the third key set 103. First key set 101 is connected to the first frame 108, as appropriate. Third key set 103 is suitably connected to second frame 109. First frame 108 and second frame 109 are further slidably connected to case 114.

First key set 101 has a protrusion (not shown), as does the third key set 103 (not shown). When first key set 101 slides away from third key set 103, first frame 108 slides due to the link provided by the protrusion on first key set 101. Similarly, when third key set 103 slides away from first key set 101, second frame 109 slides due to the link provided by the protrusion on third key set 103.

Second key set 102 has a first protrusive point 110 that is received in first slot 112 of first frame 108, as appropriate. Second key set 102 also has a second protrusive point 111 that is received in second slot 113 of second frame 109.

When first key set 101 and third key set 103 slide away from each other, the first and second protrusive points 110, 111 reside at different locations along first slot 112 and second slot 113, respectively. Because first slot 112 and second slot 113 are inclined, second key set 102 eventually raises up to the same plane as first key set 101 and third key set 103.

The movements of protrusion 110 in slot 112 are similar to the movements of protrusion 111 in slot 113. Therefore, although the description herein is focused on the movements of the protrusion 110, similar concepts also apply to protrusion 111. When the key sets change their configurations from the second state to the first state, first key set 101 and third key set 103 move closer to each other. Protrusion 111 first slides into an inclined portion slot 113, to guide second key set 102 eventually drops into a dropped position. When second key set 102 is subsequently placed in a lower position as shown in FIG. 3a, protrusion 111 slides along the horizontal portion of slot 113. Finally, first key set 101 is adjacent to third key set 103 as shown in FIG. 2a, and the key sets are in the first state, whereby the keyboard is "folded" or "compressed" for storage.

The arrangement shown in FIG. 1 is made in accordance with the configuration wherein second key 102 is in a position lower than first key set 101 and third key set 103 when device 100 is in the first state. Second key set 102 may, alternatively, be in a position higher than first key set 101 and third key set 103 when in the first state. In such an embodiment, the inclined angle of first slot 112 and second slot 113 is simply reversed to raise or lower the second key set 102. In this manner, second key set 102 descend into the same plane as first key set 101 and third key set 103, and the transformation between the first and second states is completed. Of course, other equivalent spatial arrangements could be used for moving second key set 102 out of the plane of first and third key sets 101 and 103.

Figure 9:
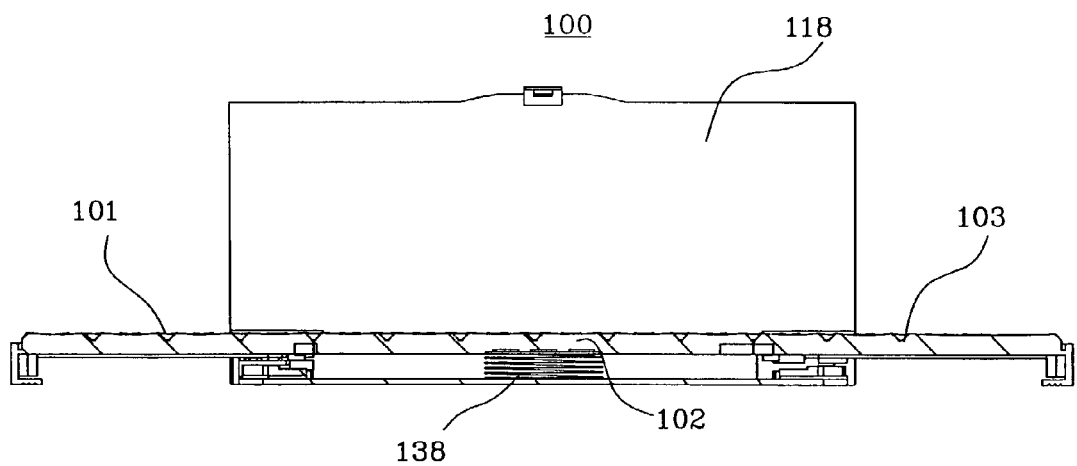
FIG. 9 is a schematic diagram showing a spring disposed under the second key set.

In another embodiment, a spring 138 is disposed under second key set 102 as shown in FIG. 9. When first key set 101 and third key set 103 slide away from each other, second key set 102 is substantially uncovered by the other key sets 101 and 103. Sequentially, the pre-pressed spring 138 is allowed to decompress and force second key set 102 to rise up to the same plane as first key set 101 and third key set 103.

Input device 100 may also include an optional locking unit that prevents second key set 102 from moving while operating in the second state. In one embodiment, first edge 104 and third edge 106 respectively have a plurality of locking protrusive points 117, as shown in FIG. 1. Second edge 105 and fourth edge 107, respectively, have a plurality of indentations (not shown) corresponding to protrusive points 117. When first edge 104 is adjacent to second edge 105 and third edge 106 is adjacent to fourth edge 107, protrusive point 117 is received in the corresponding indentation. Thus, second key set 102 remains fixed with respect to first and third key sets 101 and 103 while device 100 is operating in the second state wherein the keyboard is "expanded" for use.

When first key set 101 and third key set 103 are pulled away from each other, input device 100 changes from the second state to the first state. Protrusive points 117 correspondingly escape from the indentations and second key set 102 becomes free to move. The user pushes second key set 102 down, and at the same time pushes first key set 101 and third key set 103 close to each other. When first edge 104 is adjacent to fourth edge 107, input device 100 changes to the first state.

Input device 100 may have a cover 118 to cover the key sets in the first state. When input device 100 is in the second state, cover 118 is open, as appropriate.

Figure 5:
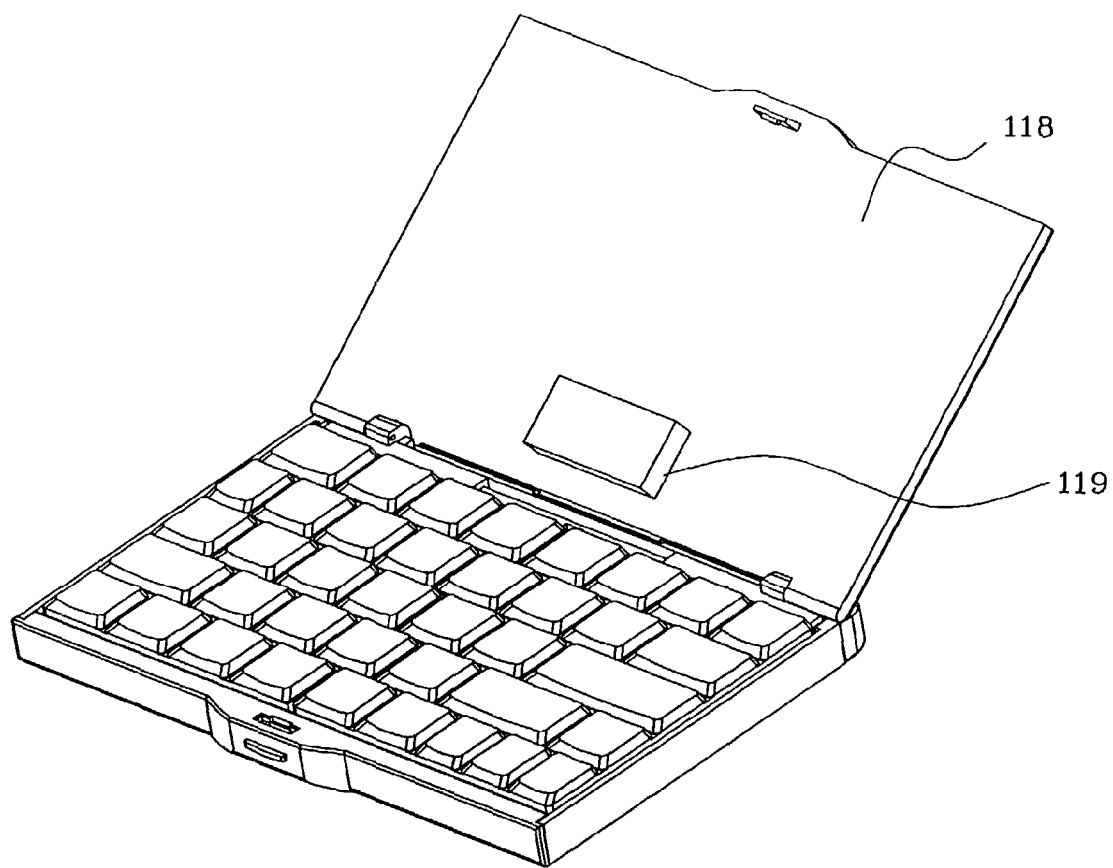
FIG. 5 is a diagram showing the input device of another exemplary embodiment of the present invention.

When a personal data processor, such as a PDA, a palm-type computer, a global positioning system, a pager, a mobile phone or the like, is connected to input device 100, input device 100 provides a connector 119 for this purpose, as shown in FIG. 5. Input device 100 in the first state may have a space to receive the connector 119 so that cover 118 does not interfere with the key sets and connector 119 while cover 118 is closed.

Figure 6:
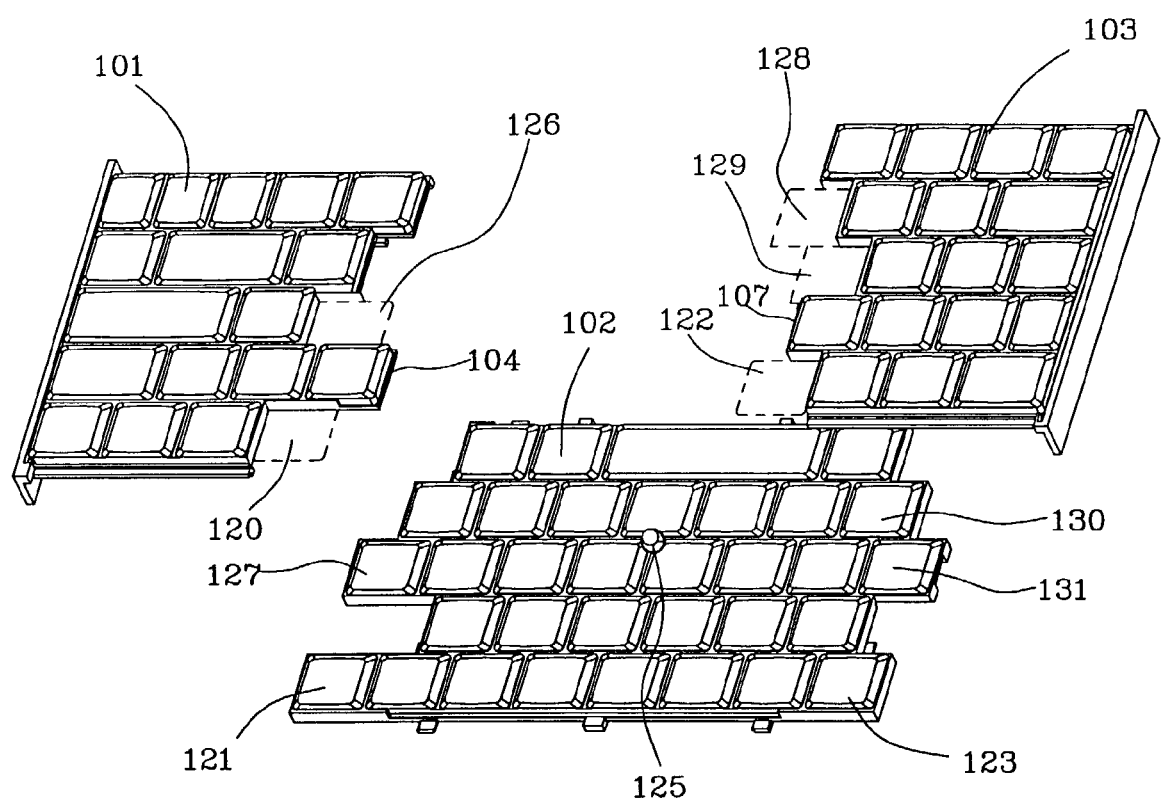
FIG. 6 is a diagram showing a portion of the exemplary input device in FIG. 5.

Referring now to FIG. 6, a key switch at position 120 of first key set 101 is moved to position 121 of second key set 102, as appropriate. At the same time, another key switch at position 122 of third key set 103 is moved to position 123 of second key set 102. The shape of first edge 104, second edge 105, third edge 106, and fourth edge 107 are therefore shown to be different from those shown in FIG. 1.

Figure 7A:
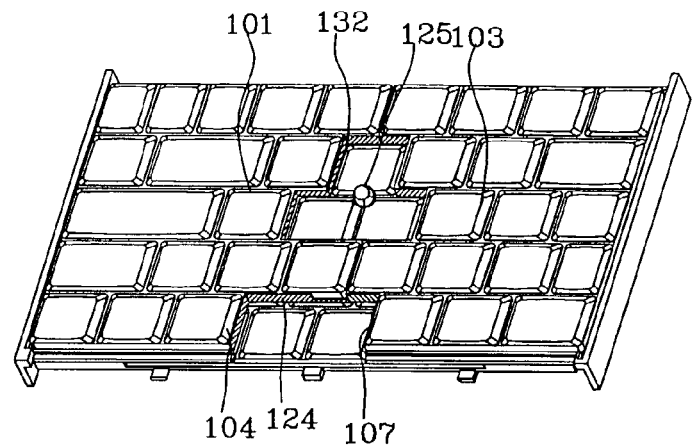
FIG. 7a is a diagram showing a portion of the exemplary input device of FIG. 6 in a first state.
Figure 7B:
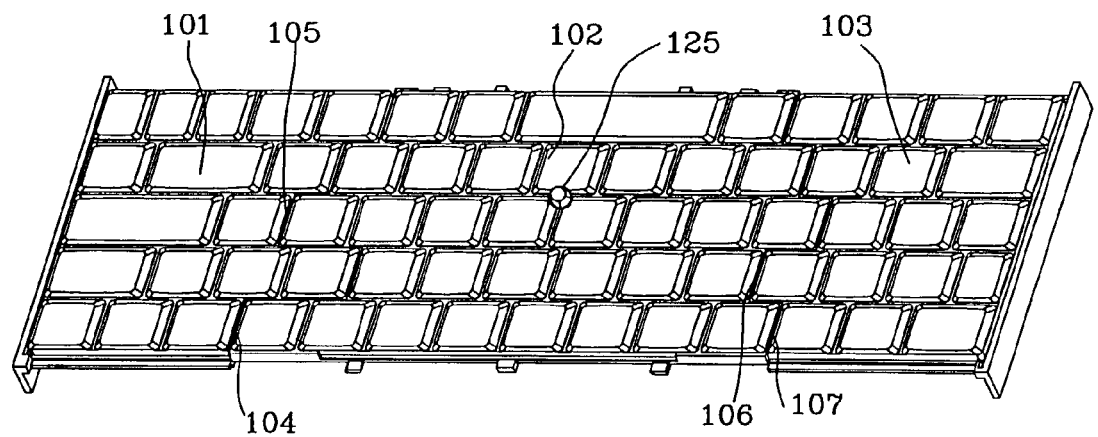
FIG. 7b is a diagram showing a portion of exemplary input device of FIG. 6 in a second state.

Please refer to FIG. 7a. When the input device 100 is in the first state, some portion of first edge 104 is suitably adjacent to some portion of fourth edge 107 such that a space 124 remains to receive connector 119. FIG. 7b is a diagram showing an exemplary input device 100 of FIG. 7a is in the second state. First edge 104 is shown adjacent to second edge 105, and third edge 106 is shown adjacent to fourth edge 107.

In another embodiment, second key set 102 includes a point stick or a hot key disposed thereon. In FIG. 6, second key set 102 includes a point stick 125. Point stick 125 may protrude from the key panels, as shown in FIG. 7a and FIG. 7b.

To prevent the key switches on first key set 101 and third key set 103 in the first state from interfering with point stick 125, rearranging of the key switches may be beneficial. For example, the key switch at &location 126 on first key set 101 is moved to second key set 102, and key switches at locations 128 and 129 on third key set 103 may be moved to second key set 102, as appropriate. Thus, there is an indentation 132 corresponding to point stick 125 when input device 100 is in the first state, as shown in FIG. 7*a*. Furthermore, a user can still operate the point stick 125 even in the first state. A similar approach would also provide space for a hot key, a joystick, trackball, touchpad or other component.

Figure 8A:
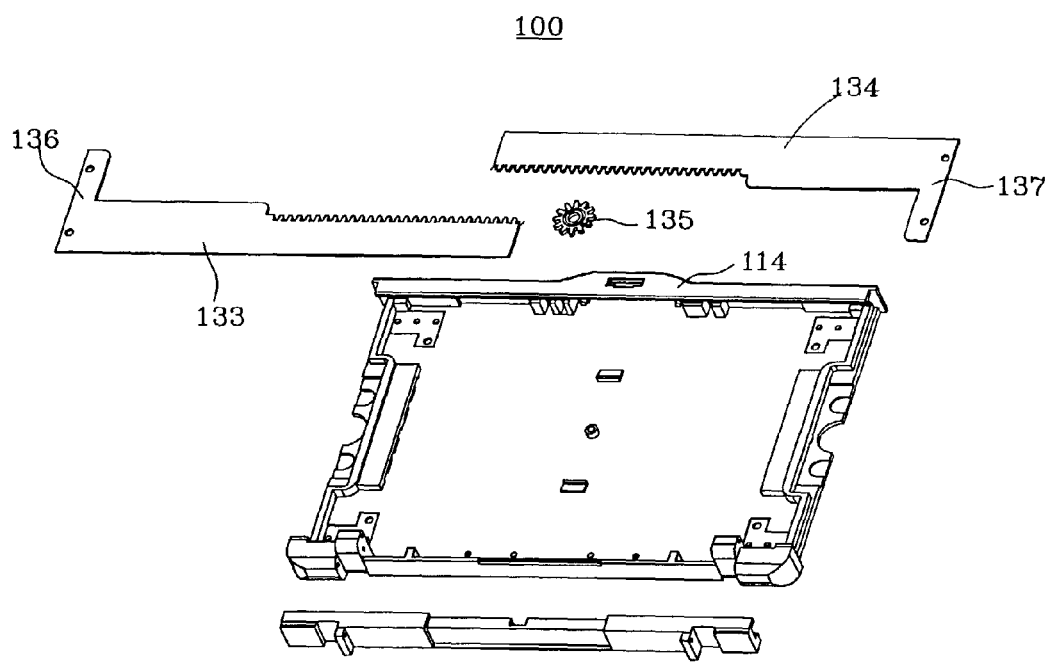
FIG. 8a and FIG. 8b are schematic diagrams showing exemplary synchronization units and the arrangement thereof.

Referring now to FIG. 8*a*, input device 100 includes an optional synchronization unit for synchronizing the motion of key set 101 and third key set 103. The synchronization unit includes a first rack 133, a second rack 134 and a gearwheel 135.

Figure 8B:
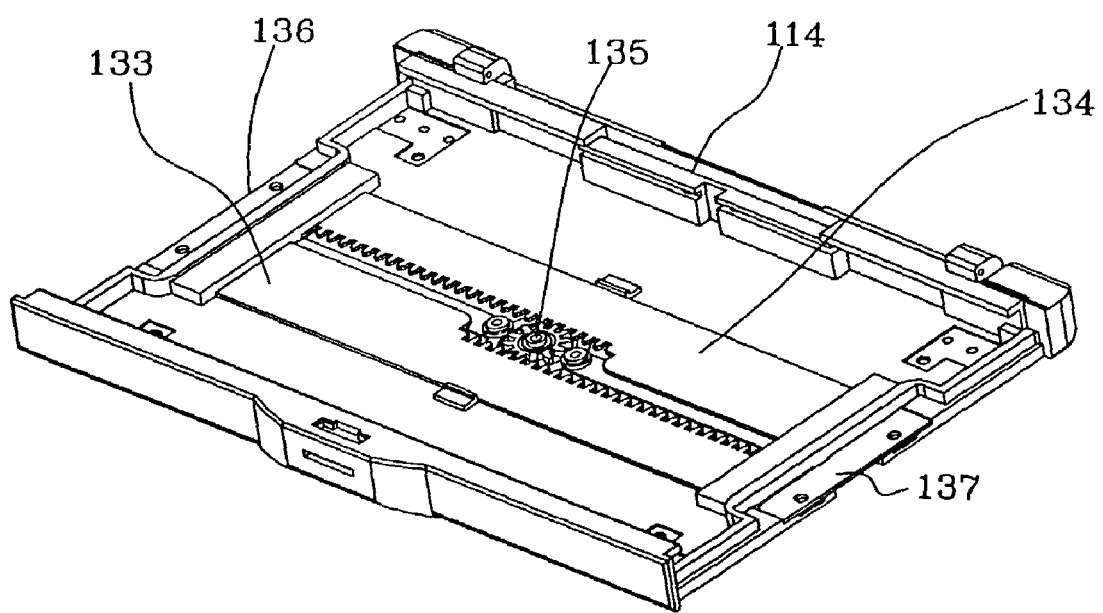

As shown in FIG. 8*b*, gearwheel 135 is rotatably connected to case 114. The connection unit 136 of first rack 133 connects to first frame 108, and second connection unit 137 of second rack 134 connects to second frame 109. First rack 133 is parallel to second rack 134, and first rack 133 and second rack 134 engage with gearwheel 135. When first rack 136 moves towards the left, gearwheel 135 rotates clockwise and drives second rack 134 to move towards the right, and vice versa. Thus, when first rack 133 is moving, first frame 108 and first key set 101 move together with first rack 133. The same action also applies to second rack 134, second frame 109, and third key set 103. First key set 101 and third key set 103 are thereby synchronized while moving, as appropriate. Many other modifications may be contrived.

It should be noted that the present invention is not only applied to an input device 160 with three key sets. Any input device with at least two key sets that move relative to each other is in the scope of the present invention. Further, the spatial arrangement of the key sets is not limited to the second key set 102 being below first key set 101 and third key set 103 in the first position. That is, second key set 102 can be in a position above first key set 101 and third key set 103 while in the first state. The key sets in the first state may be arranged in a stacked configuration, or in any other manner.

The present invention can be practiced in other equivalent ways without departing from the spirit and scope thereof, and the scope of the present invention is therefore not restricted by the description. It is therefore intended that the appended claims will cover any such modifications or embodiments as fall within the true scope of the invention.

What is claimed is:

1. An input device comprising:
   a first key set having a first key panel, wherein a movement of said first key set is in a first direction;
   a second key set having a second key panel and a protrusive point, wherein a movement of said second key set is in a direction perpendicular to said first direction; and
   a frame having a slot thereon,
   wherein said protrusive point is received in said slot, in response to said movement of said first key set; said second key set goes down or rises up along said slot relative to said first key set so that said input device is selectively in a first state or a second state; when said input device is in said second state, said first and second key panels are in a plane and said first and second key sets are configured to be side-by-side, and when said input device changes from said second state to said first state; said first key set moves toward said second key set and said second key panel leaves said plane such that said first and second key sets are configured at different levels and said first and second key panels face a same direction in said first state.

2. The input device according to claim 1, wherein said first key set further comprises a first edge including a plurality of key edges, and said second key set further comprises a second edge including a plurality of key edges, when said input device is in said second state, said first edge is adjacent to said second edge.

3. The input device according to claim 1, wherein when said second key set raises up, said input device is in said second state; and when said second key set goes down, said input device is in said first key state such that said first key set covers at least a part of said second key set.

4. The input device according to claim 1, wherein when said second key set goes down, said input device is in said second state; and when said second key set raises up, said input device is in said first state such that said first key set is covered by part of said second key set.

5. The input device according to claim 1, when said second key set is pushed by a force, said second key set goes down to a position lower than said first key set, such that said first key set slides to a position above said second key set and substantially covers part of said second key set.

6. The input device according to claim 5, further comprising a spring disposed under said second key set, when said force disappears, said spring provides said second key set with an elastic force to raise up, such that the said second key set and said first key set are in a plane.

7. The input device according to claim 1, further comprising a spring disposed under said second key set, when said first key set slides and is substantially uncovered by said second key set, said spring provides said second key set with an elastic force to go down, such that said second key set and said first key set are in a plane.

8. The input device according to claim 1, wherein said second key set further comprises a point stick.

9. The input device according to claim 1, further comprising:
   a third key set having a third key panel, wherein a movement of said third key set is in said horizontal direction;
   wherein, when said input device is in-said second state, said first, second and third key panels are in a plane, and said first, second and third key sets are configured to be side-by-side, and when said input device changes from said second state to said first state, said first and third key set move close to each other and said second key panel leaves said plane, such that said second key set is at a level different form that of said first and third key sets, and said first, second and third key panels face a same direction in said first state.

10. The input device according to claim 9, wherein said first key set further comprises a first edge including a plurality of key edges, and said third key set further comprises a fourth edge including a plurality of key edges, when said input device is in said first state, said first edge is adjacent to said fourth edge.

11. The input device according to claim 9, wherein said first key set further comprises a first edge including a plurality of key edges, said second key set further comprises a second edge and a third edge respectively including a plurality of key edges, and said third key set further comprises a fourth edge including a plurality of key edges, and when said input device is in said second state, said first edge is adjacent to said second edge, and said third edge is adjacent to said fourth edge.

12. The input device according to claim 9, further comprising a frame having a slot thereon, wherein said second key set further comprises one protrusive point, said protrusive point being received in said slot, when said first and third key sets move away from each other, said second key set selectively raises up or goes down along said slot relative to said first and third key sets, and when said second key set raises up, said input device is in said second state, and when said second key set goes down, said input device is in said first state and said first and third key sets are in a position above the second key set, such that said first and third key sets cover part of said second key set.

13. The input device according to claim 9, further comprising a frame having a slot thereon, wherein said second key set further comprises one protrusive point, said protrusive point being received in said slot, when said first and third key sets move away from each other, said second key set selectively raises up or goes down along said slot relative to said first and third key sets, and when second key set goes down, said input device is in said second state, and when said second key set raises up, said input device is in said first state and said second key set is in a position above said first and third key sets, such that said second key set covers part of said first and third key sets.

14. The input device according to claim 9, when said second key set is pushed by a force, said second goes down to a position lower than said first and third key sets, such that said first and third key sets slide to a position above said second key set and substantially cover part of said second key set.

15. The input device according to claim 14, further comprising a spring disposed under said second key set, when said force disappears, said spring provides said second key set with an elastic force to raise up, such that the said second key set and said first and third key sets are in a plane.

16. The input device according to claim 9, further comprising a spring disposed under said second key set, when said first and third key sets move away from each other and are substantially uncovered by said second key set, said spring provides said second key set with an elastic force to go down, such that said second key set and said first and third key sets are in a plane.

17. The input device according to claim 9, wherein said second key set further comprises a point stick.

18. The input device according to claim 9, further comprising a synchronous unit for synchronizing movements of said first key set and third key set, and when one of said first and third key set slides, said synchronous unit drives the other one of said first and third key sets sliding synchronously in an opposite direction.

19. An input device comprising:
a first key set having a plurality of keys, wherein said plurality of keys are arranged to form an indentation as an accommodating region;
a second key set; and
a connector for connecting said input device with an external electronic device;
wherein said second key set goes down or rises up in response to a movement of said first key set so that said input device is selectively in a first state or a second state, said connector is received in said accommodating region when said input device is in said first state, and said connector is capable of connecting said input device with said external electronic device when said input device is in said second state.

20. The input device according to claim 19, further comprising a second key set, when said input device is in said first state, said first and second key sets are configured at different levels, and when said input device is in said second state, said first and second key sets are configured to be side-by-side in a plane.

21. The input device according to claim 20, wherein said first key set comprises a third key set and a fourth key set, said third and fourth key sets being horizontally assembled together to form said first key set, and when said input device is in said first state, said third and fourth key sets are in a same plane and said second key set is configured to be in a plane different from that of said third arid fourth key sets, and when said input device is in said second state, said second, third and fourth key sets are in a same plane.

22. An input device comprising:
a first key set having a first edge, and said first key edge having an indentation portion;
a second key set having a second edge; and
a second input unit disposed on said second key set;
when said input device is in a first state, said first and second key sets are configured at different levels, said indentation portion defines a space for accommodating part of said second input unit, and when said input device is in a second state, said first and second key sets are configured to be side-by-side and said first edge is substantially adjacent to said second edge.

23. The input device according to claim 22, wherein said second input unit is a point stick.

* * * * *